United States Patent Office 3,301,818
Patented Jan. 31, 1967

3,301,818
EPOXIDE RESINS DERIVED FROM A BIS (p-HYDROXYCUMYL)BENZENE
Oliver A. Barton, Florham Park, and Enid Schwartz, New Providence, N.J., assignors to Allied Chemical Corporation, New York, N.Y., a corporation of New York
No Drawing. Filed Dec. 15, 1961, Ser. No. 159,775
2 Claims. (Cl. 260—47)

This invention relates to new epoxide resins and processes for their production.

It is an object of this invention to provide new epoxide resins, particularly transparent, water-white epoxide resins, prepared from 1,4-bis(p-hydroxycumyl)benzene and 1,3-bis(p-hydroxycumyl)benzene.

Another object of this invention is to provide processes for production of the new epoxide resins, particularly the transparent, water-white epoxide resins, in high yield.

Other objects of this invention will become apparent from the following description.

The new epoxide resins of the present invention are represented by the following formula:

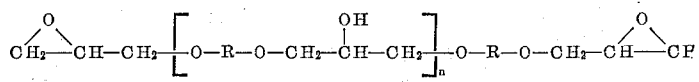

wherein R represents a chain consisting of three phenylene groups joined to one another by isopropylidine groups, said chain being derived from a bisphenol of the group consisting of 1,4-bis(p-hydroxycumyl)benzene and 1,3-bis(p-hydroxycumyl)benzene and represented by the following formulas:

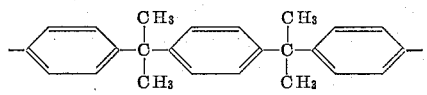

and

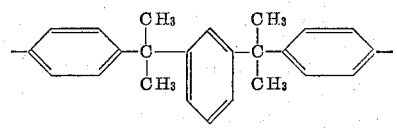

and $n$ is an integer ranging from 0 to 20.

These resins may be prepared by reacting a bis-phenol of the group consisting of 1,4-bis(p-hydroxycumyl)benzene and 1,3-bis(p-hydroxycumyl)benzene with epichlorohydrin in the presence of an alkali and recovering the epoxide resin from the resulting reaction mass.

Copending application serial No. 140,221 of Broderick et al., filed September 25, 1961, discloses and claims 1,4-bis(p-hydroxycumyl)benzene and 1,3-bis(p-hydroxycumyl)benzene which are represented by the following formulas:

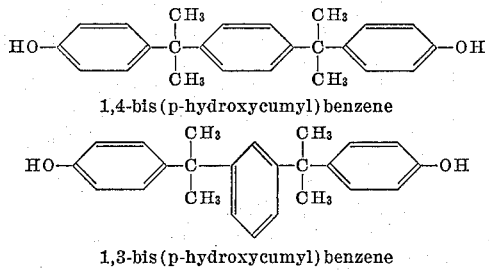

The epoxide equivalent of epoxide resins is employed for the purpose of characterizing their structure and usefulness. The epoxide equivalent is the weight in grams of resin which contains 1 gram equivalent of epoxide group. The epoxide equivalent is determined by reacting a known quantity of the resin with a known quantity of hydrochloric acid and back-titrating the remaining acid to determine its consumption. Low molecular weight resins have an epoxide equivalent in the range of 230 to 330. Higher molecular weight resins have correspondingly higher epoxide equivalent since in each such molecule there are long chains between the epoxide groups. Assuming that the resin chains are linear and that the epoxide groups are at each end of the molecule, the epoxide equivalent is about one-half of the average molecular weight of the resin.

The epoxide equivalent of the resins prepared from 1,4-bis(p-hydroxycumyl)benzene and 1,3-bis(p-hydroxycumyl)benzene may be controlled by varying either the molar ratio of the reactants or the reaction conditions or both.

The epoxide equivalent, and therefore the molecular weight, varies inversely with the molar ratio of the reactants. Molar ratios of about 1 to 5 epichlorohydrin to 1,4-bis(p-hydroxycumyl)benzene or 1,3-bis(p-hydroxycumyl)benzene produce high epoxide equivalent resins, while molar ratios in excess of 5 to about 20 produce low epoxide equivalent resins.

The reaction must be carried out in the presence of an alkali, preferably an alkali metal hydroxide such as sodium hydroxide, potassium hydroxide and lithium hydroxide. The alkali is used in amount sufficient to neutralize the hydrochloric acid produced during the reaction and to transform the chlorohydrin formed on initial condensation of the bis(p-hydroxycumyl)benzene molecule with epichlorohydrin into an epoxide-containing molecule. Such amount generally ranges from about 2 ot 4 mols of alkali per mol of 1,4-bis(p-hydroxycumyl)-benzene or 1,3-bis(p-hydroxycumyl)benzene, and preferably about 2.0 to 2.5 mols. The alkali is preferably introduced in a gradual manner for the purpose of controlling the exothermic heat of reaction and, in turn, the reaction temperature.

We have discovered that high yields of transparent, water-white epoxide resins are obtained when an aliphatic monohydroxy alcohol, preferably an aliphatic monohydroxy alcohol containing 1 to 4 carbon atoms, is employed in the reaction system. Examples of suitable alcohols include methanol, ethanol, propanol, isopropanol and butanol. The alcohol is generally used in amount of at least about 20 percent and preferably about 20 to 40 percent of the total weight of the reactants. Although larger amounts of the alcohol are suitable, it tends to become uneconomical to use an amount of alcohol in excess of about 60 percent of the total weight of the reactants.

If an aliphatic monohydroxy alcohol is not present in the reaction system, it is essential, in order for the reaction to commence, that a minimum amount of water be present in the reaction mixture, i.e. at least about 0.3 percent of the total weight of the reactants. Moreover, in production of low epoxide equivalent resins, the reaction is adversely affected by the presence of water in amount above about 5 percent of the total weight of the reactants.

We have found, however, that when an aliphatic monohydroxy alcohol is employed, the necessity of the presence of water as reaction initiator is eliminated. Moreover, in the production of low epoxide equivalent resins, water present in excess of 5 percent may be tolerated.

When it was attempted to produce transparent, water-white epoxide resin in high yield in the absence of the alcohol, reaction temperature of about 90° to 110° C. and reaction time of about 4 to 6 hours were required. In contrast, where the reaction was carried out in the presence of alcohol, high yield of transparent, water-white epoxide resin was obtained at temperature of about 45° C. up to the boiling point of the alcohol employed in about three-fourths to 2 hours. For example, when ethanol is used, the reaction may be carried out at temperatures of about 45° to about 78° C. for about three-fourths to 2 hours.

The epoxide resin may be isolated from the reaction mixture by any conventional means. For example, after completion of the reaction in the presence of an aliphatic monohydroxy alcohol, a two layer system results, the upper layer containing water, alcohol and unreacted 1,4-bis(p-hydroxycumyl)benzene or 1.3-bis(p-hydroxycumyl) benzene, and the lower layer containing water, alcohol, by-product salt, excess epichlorohydrin and desired 1,4-bis(p-hydroxycumyl)benzene or 1,3-bis(p-hydroxycumyl) benzene epoxide resin. The lower layer may be separated and filtered in order to remove the by-product salt. This filtrate may then be distilled under vacuum to remove the remaining constituents with the exception of the epoxide resin. For highest purity, the resin may be dissolved in a suitable solvent such as acetone, toluene and ethanol, filtered and again subjected to distillation in order to remove any remaining contaminant.

Epoxide resins may be prepared from 1,4-bis(p-hydroxycumyl)benzene or 1,3-bis(p-hydroxycumyl)benzene in varying degrees of molecular weight in the form of liquids to semi-solids, dependent upon the use for which they are intended. The epoxide resins may be used for chemical resistant industrial surface coatings, laminating resins for metal forming tools, electrical embedments, adhesives, caulking and patching compounds, etc.

The following examples are given for the purpose of illustration only and should not be construed as limiting the present invention. In the examples, parts are by weight.

EXAMPLE 1

A charge of 50 parts of 1,4-bis(p-hydroxycumyl)benzene, 65.5 parts of epichlorohydrin and 1 part of distilled water was placed in a suitable reaction pot which was equipped with a condenser, thermowell, stirrer, and reagent feed opening. The reaction mass was heated to temperature of 75° C. with constant stirring over a period of one hour. A total of 12.14 parts of caustic soda was added in four equal increments at 15 minute intervals. After addition of the caustic soda, the reaction mass was maintained at temperature of 85° C. for an additional 10 minutes in order to insure complete reaction. Excess epichlorohydrin and water were then removed by vacuum distillation at temperature of 155° C. and pressure of 26 inches of mercury. The temperature of the reaction mass was reduced to 90° C., and 30 parts of toluene were added as diluent. Then, 1 part of activated charcoal, 8.8 parts of sodium aluminate and 2 parts of a filtering aid ("Supercell") were added. The reaction mass was then refluxed for an additional 10 minutes. Thereupon the entire mass was filtered to remove by-product salt and subsequently vacuum distilled to remove the toluene. An epoxide resin of 1,4-bis(p-hydroxycumyl)benzene was obtained as an opaque, white semi-solid in yield of 65 percent based upon the amount of 1,4-bis(p-hydroxycumyl)benzene charged. The resin had an epoxide equivalent of 320 and a relative viscosity in dioxane of 1.0700.

EXAMPLE 2

34.6 parts of 1,4-bis(p-hydroxycumyl)benzene, 55.5 parts epichlorohydrin and 1 part of water were placed in the reaction pot used in Example 1, stirred and heated to temperature of 90° C. Thereupon 8.8 parts of caustic soda were added in four equal increments at 15 minute intervals, while the reaction temperature was maitained at about 90° to 100° C. The reaction mass was vacuum distilled at temperature of 150° C. and pressure of 26 inches of mercury in order to remove excess epichlorohydrin and water. The resin was dissolved in toluene and filtered to remove salt. The toluene was removed by vacuum stripping, and a yield of 72 percent of an opaque, white semi-solid epoxide resin having an epoxide equivalent of 306 was obtained. The relative viscosity in dioxane of the resin was 1.0700.

EXAMPLE 3

24.2 parts of 1,3-bis(p-hydroxycumyl)benzene 38.8 parts epichlorohydrin and 0.7 part of water were charged to the reaction pot used in Example 1, stirred and heated to temperature of 90° C. over a period of 1 hour. Thereupon 6.2 parts of caustic soda were added in four equal increments at 15 minute intervals, while the reaction temperature was maintained at about 90° C. The reaction mass was vacuum distilled at temperature of 150° C. and pressure of 26 inches mercury in order to remove excess epichlorohydrin and water. 79 parts of dry acetone were stirred into the residue and the mixture filtered to remove salt. The acetone solution was then concentrated in vacuum at temperature up to 150° C. and pressure of 26 inches of mercury to leave an 85 percent yield of a transparent, pale yellow semi-solid having an epoxide equivalent of 306 and a relative viscosity in dioxane of 1.0000.

EXAMPLE 4

87.5 parts of 1,4-bis(p-hydroxycumyl)benzene, 140 parts of epichlorohydrin and 60 parts of ethanol were charged to the reaction pot used in Example 1. The reaction mass was heated to temperature of 60° C., whereupon 22 parts of caustic soda in the form of a 50 percent aqueous solution were added dropwise over a period of 15 minutes. An additional heating period of 30 minutes at this temperature was carried out to insure complete reaction. The resulting two layer system was then filtered to remove by-product salt, followed by separation of the lower layer. This layer was washed with a 1:1 volume ratio solution of alcohol and water to remove excess epichlorohydrin, water, ethanol and remaining salt and then vacuum distilled at temperature of 150° C. and pressure of 26 inches of mercury. An 87 percent yield of a transparent, water-white semi-solid epoxide resin having an epoxide equivalent of 270 was obtained. The relative viscosity in dioxane of the resin was 1.0700.

EXAMPLE 5

The conditions of this reaction were so regulated as to produce an epoxide resin from 1,4-bis(p-hydroxycumyl)benzene having a high epoxide equivalent. 69.2 parts of 1,4-bis(p-hydroxycumyl)benzene, 46.3 parts of epichlorohydrin and 40 parts of ethanol were added to the reaction pot used in Example 1. The reaction mass was then treated with 35.2 parts of a 50 percent aqueous caustic soda solution in the same manner as described in Example 3. Excess epichlorohydrin, water and ethanol were removed by decantation. The resulting resin was washed with a 2:1 volume proportion of hot water. The water extract was decanted and the purified product was then dissolved in acetone, filtered to remove the by-product salt and vacuum stripped at temperature of 125° C. and pressure of 90 millimeters of mercury. A 90 percent yield of a transparent, water-white solid resin having an epoxide equivalent of 394 was obtained. The resin had a relative viscosity in dioxane of 1.0900.

A film was prepared from the epoxide resin produced in this example by treating 10 parts of the resin with 0.5 part of diethylene triamine, plasticizing it with 1.5 parts of "Beetle 216-8" (an alkylated urea-formaldehyde condensation product dissolved in butanol-xylol solvent) and then casting it on bonderized steel to a dry film thickness of 2 mils. The film, after curing for one hour at 93° C., had the following physical and chemical properties:

Physical properties

Mandrel test—passed
Impact test—passed 28 inches/lb.
Tape adhesion—passed
Rocker hardness—56

Chemical properties

Water—No effect
10% acetic acid—No effect
5% caustic soda solution—No effect

The above tests were carried on as described in "Physical and Chemical Examination: Paints, Varnishes, Lacquers, Colors," eleventh edition, 1950.

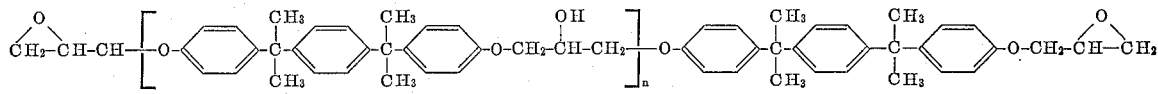

The following example is given to illustrate the excellent tensile and adhesive properties of an epoxide resin of this invention.

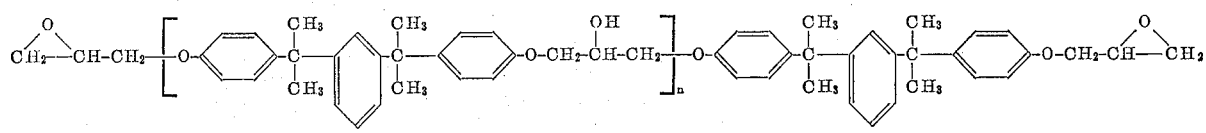

EXAMPLE 6

34.6 parts of 1,4-bis(p-hydroxycumyl)benzene, 55 parts of epichlorohydrin and 1 part of water were charged into the reaction pot used in Example 1, stirred and heated to temperature of 100° C. for a period of 1 hour. To the reaction mass 8.8 parts of caustic soda were added in four equal increments at intervals of 15 minutes. The reaction mass was maintained at 100° C. for an additional hour, whereupon the product was vacuum stripped at temperature of 150° C. and pressure of 26 inches of mercury in order to remove excess epichlorohydrin and water. The crude product was then dissolved in 129 parts of toluene, filtered to remove by-product salt and once again vacuum stripped to remove toluene. A transparent, yellow semi-solid product was obtained having an epoxide equivalent of 295 and a relative viscosity in dioxane of 1.0700.

10 parts of the above resin were mixed with 0.7 part of diethylene triamine, and the mixture was spread on 0.5 inch of said blasted ⅛-inch x 1 inch x 4.5 inches, aluminum strips. Two such coated strips were then lap jointed over a ½-inch x 1 inch area and compressed to give a 10 mil bond joint. The bond was then cured at temperature of 90° C. for a period of 2 hours. Tensile shear tests showed that the bond withstood pressures up to 2000 p.s.i.

Since various changes and modifications may be made in this invention without departing from the spirit thereof, the invention is deemed to be limited only by the scope of the appended claims.

We claim:

1. A transparent, water-white epoxide resin having the following formula:

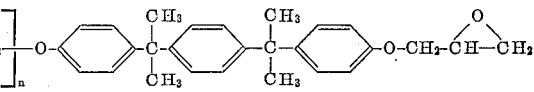

wherein $n$ is an integer ranging from 0 to 20.

2. A transparent, water-white epoxide resin having the following formula:

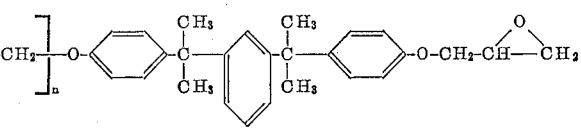

wherein $n$ is an integer ranging from 0 to 20.

References Cited by the Examiner

UNITED STATES PATENTS

| | | | |
|---|---|---|---|
| 2,811,564 | 10/1957 | Bader | 260—47 |
| 2,848,435 | 8/1958 | Griffin et al. | 260—47 |
| 2,865,887 | 12/1958 | Douglas | 260—47 |
| 2,986,550 | 5/1961 | Davis et al. | 260—47 |

FOREIGN PATENTS 1,106,304   7/1955   France.

OTHER REFERENCES

Pacquin, "Epoxydverbindungen and Epoxydharze" page 279 relied on; Springer-Verlag, Berlin, 1958.

WILLIAM H. SHORT, *Primary Examiner.*

LOUIE P. QUAST, *Examiner.*

T. D. KERWIN, P. HELLER, *Assistant Examiners.*